(12) United States Patent
Geuß

(10) Patent No.: US 11,548,393 B2
(45) Date of Patent: Jan. 10, 2023

(54) BRAKING METHOD AND SYSTEM FOR AN ELECTRIC VEHICLE

(71) Applicant: AUDI AG, Ingolstadt (DE)

(72) Inventor: Matthias Geuß, Breitengüßbach (DE)

(73) Assignee: AUDI AG, Ingolstadt (DE)

( * ) Notice: Subject to any disclaimer, the term of this patent is extended or adjusted under 35 U.S.C. 154(b) by 91 days.

(21) Appl. No.: 16/512,870

(22) Filed: Jul. 16, 2019

(65) Prior Publication Data

US 2020/0079220 A1 Mar. 12, 2020

(30) Foreign Application Priority Data

Sep. 6, 2018 (DE) .......................... 102018215134.2

(51) Int. Cl.
| | |
|---|---|
| *B60L 7/26* | (2006.01) |
| *B60T 8/1755* | (2006.01) |
| *B60T 8/32* | (2006.01) |
| *B60L 7/18* | (2006.01) |

(52) U.S. Cl.
CPC .................. *B60L 7/26* (2013.01); *B60L 7/18* (2013.01); *B60T 8/1755* (2013.01); *B60T 8/17552* (2013.01); *B60T 8/321* (2013.01); *B60T 2230/00* (2013.01); *B60T 2240/00* (2013.01); *B60T 2250/00* (2013.01); *B60T 2250/03* (2013.01); *B60T 2260/00* (2013.01); *B60T 2270/304* (2013.01); *B60T 2270/604* (2013.01)

(58) Field of Classification Search
CPC ................................................ B60T 2270/604
See application file for complete search history.

(56) References Cited

U.S. PATENT DOCUMENTS

| | | | | |
|---|---|---|---|---|
| 5,476,310 | A * | 12/1995 | Ohtsu ..................... | B60L 7/003 303/3 |
| 5,492,192 | A * | 2/1996 | Brooks ................. | B60T 8/4863 701/84 |
| 6,275,763 | B1 * | 8/2001 | Lotito ....................... | B60T 1/10 188/DIG. 1 |
| 6,691,013 | B1 * | 2/2004 | Brown .................. | B60W 10/18 180/197 |
| 6,709,075 | B1 * | 3/2004 | Crombez ............ | B60L 15/2009 303/3 |
| 6,719,379 | B2 * | 4/2004 | Crombrez ................ | B60T 1/10 303/152 |

(Continued)

FOREIGN PATENT DOCUMENTS

| | | |
|---|---|---|
| CN | 101484341 A | 7/2009 |
| CN | 102991479 A | 3/2013 |

(Continued)

OTHER PUBLICATIONS

Varocky, Benchmarking of Regenerative Braking for a Fully Electric Car, Jan. 2011, TNO Automotive, Helmond Integrated Safety Department (Year: 2011).*

(Continued)

*Primary Examiner* — Christian Chace
*Assistant Examiner* — Scott R Jagolinzer
(74) *Attorney, Agent, or Firm* — Maier & Maier, PLLC

(57) ABSTRACT

A method for braking an electric vehicle in which a first axle of an electric vehicle is decelerated by an electric motor of the electric vehicle and/or by a friction brake system of the electric vehicle.

17 Claims, 3 Drawing Sheets

(56) References Cited

U.S. PATENT DOCUMENTS

| | | | |
|---|---|---|---|
| 7,458,650 B2* | 12/2008 | Toyota | B60T 1/10 303/151 |
| 7,922,265 B1* | 4/2011 | Cottrell, V | B60T 1/10 303/152 |
| 8,308,248 B2* | 11/2012 | Jager | B60W 30/18172 303/152 |
| 8,388,071 B2* | 3/2013 | Yokoyama | B60T 1/10 303/152 |
| 8,788,144 B2* | 7/2014 | Krueger | B60L 3/10 701/36 |
| 9,162,657 B2* | 10/2015 | Li | B60W 10/08 |
| 9,527,484 B2* | 12/2016 | Minarcin | B60W 10/08 |
| 10,272,902 B2* | 4/2019 | Miyazaki | B60L 50/61 |
| 2004/0054450 A1* | 3/2004 | Nakamura | B60L 7/26 701/22 |
| 2004/0243292 A1* | 12/2004 | Roy | B60W 50/06 701/1 |
| 2006/0169522 A1* | 8/2006 | Katayama | B60W 40/114 180/421 |
| 2007/0029874 A1* | 2/2007 | Finch | B60W 10/184 303/152 |
| 2008/0079311 A1* | 4/2008 | Schneider | B60T 8/1755 303/152 |
| 2009/0222156 A1* | 9/2009 | Krueger | B60W 20/13 701/22 |
| 2010/0094511 A1* | 4/2010 | Krueger | B60W 10/08 701/48 |
| 2010/0113215 A1 | 5/2010 | Jäger et al. | |
| 2010/0114437 A1* | 5/2010 | Boss | B60K 28/08 701/48 |
| 2010/0127562 A1* | 5/2010 | Yokoyama | B60T 8/267 303/151 |
| 2012/0055744 A1* | 3/2012 | Chen | B60W 30/02 188/106 P |
| 2014/0183933 A1* | 7/2014 | Kuhlman | F16D 61/00 303/3 |
| 2018/0086209 A1* | 3/2018 | Jeon | B60L 3/108 |
| 2018/0244159 A1* | 8/2018 | Satterthwaite | B60T 8/17552 |

FOREIGN PATENT DOCUMENTS

| | | |
|---|---|---|
| CN | 103946083 A | 7/2014 |
| CN | 105008191 A | 10/2015 |
| DE | 102008017480 A1 | 10/2008 |
| DE | 102011086706 A1 | 5/2013 |
| DE | 102012215138 A1 | 2/2014 |
| DE | 102013203824 A1 | 9/2014 |
| EP | 2703238 A1 | 3/2014 |

OTHER PUBLICATIONS

Guo et. al., Regenerative Braking Strategy for Electric Vehicles, 2009, IEEE (Year: 2009).*

Tur et. al., An Introduction to Regenerative Braking of Electric Vehicles as Anti-Lock Braking System, Jun. 13-15, 2007, IEEE (Year: 2007).*

German Examination Report dated May 6, 2019 in corresponding German Application No. 10 2018 215 134.2; 16 pages.

Office Action dated Aug. 31, 2022, in connection with corresponding Chinese Patent Application No. 201910822734.0 (19 pp., including machine-generated English translation).

* cited by examiner

BRAKING METHOD AND SYSTEM FOR AN ELECTRIC VEHICLE

FIELD

The disclosure relates to a method for braking an electric vehicle in which the deceleration torque for a first axle of an electric vehicle is provided by an electric motor of the electric vehicle and/or by a friction brake system of the electric vehicle.

BACKGROUND

Like vehicles driven by internal combustion engines, electric vehicles mostly include a hydraulic friction brake system, which is configured to provide a deceleration torque for wheels of the electric vehicle by applying a friction force to the wheels. The deceleration torque is opposed to a rotation of the wheels in order to brake or stop the electric vehicle, i.e. to reduce a travel speed of the electric vehicle. Modern friction brake systems can dynamically variably distribute the deceleration torque provided to wheels and/or axles of the electric vehicle.

For example, DE 10 2013 203 824 A1 discloses a method for braking a vehicle which comprises a hydraulic friction brake system with two hydraulic components, each of which providing a deceleration torque. The friction brake system has two operating modes, wherein either a first hydraulic component provides a greater deceleration torque than a second hydraulic component or the first hydraulic component provides a smaller deceleration torque than the second hydraulic component. The method selects an operating mode of the friction brake system based on a specified variable, wherein a vehicle type, a driving situation, a traffic situation, or an environmental situation can be the specified variable.

Furthermore, electric vehicles each include at least one vehicle battery and at least one electric motor connected to it, which, in a first operating mode uses electric power provided by the vehicle battery to apply a propulsion torque to the wheels of the electric vehicle to drive the electric vehicle.

The electric motor can typically be operated as a generator in a second operating mode, to which generator a torque is applied by the wheels of the electric vehicle, and the kinetic energy from said wheels is converted into electric power to charge the vehicle battery. This regenerative operating mode of the electric motor is also called regenerative operation or recuperative mode. Recuperation of electric power and storing it in the vehicle battery increases the efficiency of the electric vehicle, thereby increasing a range of the electric vehicle.

In the regenerative mode, the electric motor additionally provides a deceleration torque for the wheels. This regenerative deceleration torque acts in the opposite direction of the rotation of the wheels, whereby the vehicle is braked. Accordingly, an electric vehicle can braked, in addition to its friction brake system, by its electric motor when said motor is in its regenerative or recuperative mode.

But the recuperative electric motor does not have a predetermined variable deceleration potential. Such a deceleration potential, i.e. the maximum deceleration torque it can provide, is determined by a state of charge (SOC) of the vehicle battery, which typically varies during the operation of the electric vehicle, since the vehicle battery discharges during a trip. In a fully charged vehicle battery, the deceleration potential of the electric motor is equal to zero and increases as the vehicle battery discharges, i.e. as the state of charge of the vehicle battery decreases. Design-dependent operating parameters of the electric motor, such as advantageous torque or rotational speed ranges as well as upper limits for a temperature or a magnetic field of the electric motor also influence the deceleration potential of the electric motor.

Electric vehicles further comprise an operating element, typically a so-called brake pedal, with which a driver of the electric vehicle can determine a total deceleration torque for the electric vehicle. The brake pedal may also be configured as an accelerator pedal to allow selective acceleration and deceleration of the electric vehicle by means of a single operating element. In addition, the electric vehicle may include a system for autonomous driving, which determines the total deceleration torque. Electric vehicles further comprise a control device, which calculates a deceleration torque to be provided by the friction brake system and electric motor, respectively, based on the total deceleration torque and which controls the friction brake system and the electric motor according to the calculated deceleration torque.

The deceleration torque provided by the electric motor must be subtracted from the deceleration torque provided by the friction brake system to prevent overbraking of the electric vehicle due to an additional regenerative deceleration torque. As a result, the total deceleration torque is the sum total of the deceleration torques provided by the friction brake system and the electric motor, wherein a deviation between the total deceleration torque and the sum of deceleration torques provided is acceptable when the driver does not notice it. Such an overlap of deceleration torques is called blending, and a brake system for an electric vehicle based on blending is called a blending-capable or blendable brake system.

DE 10 2011 086 706 A1 discloses such a system and method for braking an electric vehicle. The system includes a recuperative electric motor and a hydraulic friction brake system having two hydraulic brake circuits, each of which being capable of decelerating a pair of wheels of the electric vehicle and being operated by a joint operating element, for example a brake pedal. In this method, a brake fluid volume is displaced from a master brake cylinder into an accumulator volume at most in one of the two brake circuits in order to provide a reduced deceleration torque with this brake circuit in favor of the recuperative electric motor, while a deceleration torque of the other brake circuit is not reduced. The method can take into account a deceleration potential of the electric motor.

DE 10 2012 215 138 A1 discloses a similar method for braking an electric vehicle, which includes a hydraulic friction brake system having two brake circuits, at least two wheels which can each be independently decelerated by one brake circuit of the hydraulic friction brake system, and an electric motor, wherein the at least two wheels can be additionally and independently decelerated by the electric motor. In this method, a deceleration torque provided by a brake circuit is reduced or eliminated by operating a separating valve, and the electric motor provides a respectively increased deceleration torque. A deceleration potential of the electric motor is taken into account when determining the regenerative deceleration torque.

However, regenerative operation of the electric motor can impair a directional stability of the electric vehicle. This specifically applies when the electric motor of the electric vehicle is exclusively associated with one axle. Recuperation and, accordingly, the regenerative deceleration torque must often be greatly reduced, especially when the electric vehicle reaches its limits of driving dynamics, whereby the efficiency of the electric vehicle decreases.

It is the problem of the invention to propose an improved method for braking an electric vehicle, which avoids the disadvantages described above and has a higher efficiency.

In addition, it is the problem of the invention to provide a control device for an electric vehicle and an electric vehicle.

SUMMARY

The subject matter of the present invention is a method for braking an electric vehicle in which the deceleration torque for a first axle of an electric vehicle is provided by an electric motor of the electric vehicle and/or by a friction brake system of the electric vehicle. In other words, the method can be carried out using a brake system which is capable of blending, at least with respect to one axle. If the electric vehicle comprises a front and a rear axle as usual, the first axle may either be the front axle or the rear axle. As used herein, the term 'axle' can also mean an individual wheel of the electric vehicle.

In the method according to the invention, a deceleration torque to be provided is determined depending on the directional stability of the electric vehicle. On the one hand, a great total deceleration of the electric vehicle, that is, hard braking, can reduce the directional stability of the electric vehicle. On the other hand, deceleration by the electric motor in itself can severely influence, i.e. reduce, the directional stability of the electric vehicle. For example, the directional stability of the electric vehicle can be impaired due to an axle that is overbraked because of the regenerative deceleration torque. Appropriate consideration of the influence of the regenerative deceleration torque on the driving behavior of the electric vehicle is thus linked to improved directional stability of the electric vehicle. Vice versa, such an approach allows that a regenerative deceleration torque compatible with directional stability is provided, which results in strong recuperation and thus in a high efficiency of the electric vehicle. High directional stability on the one hand and high efficiency on the other make the proposed braking method highly efficient.

It is preferred that a deceleration torque provided by the electric motor is reduced as directional stability diminishes. Regenerative deceleration of the electric vehicle can destabilize the electric vehicle during a braking process. The directional stability of the electric vehicle increases as the deceleration torque provided by the electric motor is reduced. In an extreme case, the deceleration torque of the electric motor can be set to zero, such that the vehicle is only braked by the friction brake system. If the deceleration torque of the electric motor is sufficiently small and directional stability of the electric vehicle is low, known control systems such as an anti-lock brake system (ABS), traction control system (TCS), electronic stability program (ESP) and the like, can additionally be activated.

Advantageously, a deceleration torque for a second axle of the electric vehicle is exclusively provided by the friction brake system. Accordingly, both axles of the electric vehicle can be decelerated, wherein the friction brake system can provide an individual deceleration torque for each axle, for example to influence the directional stability of the electric vehicle in a braking process. When the first axle is the rear axle of the electric vehicle, the second axle is the front axle of the electric vehicle and vice versa.

In a preferred embodiment, relative portions of the axle deceleration torque for the first axle and an axle deceleration torque for the second axle of a specific total deceleration torque of the electric vehicle are provided depending on directional stability. The driver of the electric vehicle determines a total deceleration torque by means of an operating element, for example, an accelerator pedal. Alternatively, the total deceleration torque can be determined by a functional system for autonomous driving of the electric vehicle. The determined total deceleration torque is distributed to the two axles such that a directional stability of the electric vehicle is ensured in the current driving situation of the electric vehicle. A stable driving situation during braking can be present in an electric vehicle having a rear axle driven by an electric motor when the axle deceleration torque acting on the rear axle is 30% of the total deceleration torque and the axle deceleration torque acting on the front axle is 70% of the total deceleration torque.

In an embodiment, a deceleration torque of the electric motor compatible with the deceleration potential of the electric motor that is as large as possible is provided in a first range of directional stability, and/or a deceleration torque of the electric motor compatible with the deceleration potential of the electric motor that is as large as possible is provided in a second range of directional stability, wherein relative portions of axle deceleration torques are provided that are stable with respect to driving dynamics, and/or a deceleration torque of the electric motor compatible with the deceleration potential of the electric motor that is reduced compared to an as large as possible deceleration torque in a third range of directional stability, wherein relative portions of axle deceleration torques are provided that are stable with respect to driving dynamics. This means that three ranges are defined within the entire spectrum of directional stability of the electric vehicle, in which different operating modes, i.e. blending ratios, between the electric motor and the friction brake system are used. These ranges may be predetermined in a fixed or configurable manner.

In the first range of directional stability, the maximum possible deceleration torque with respect to the deceleration potential of the electric motor will be provided unconditionally. In other words, the recuperated electric power is at an absolute maximum, the respective current deceleration potential of the electric motor is completely utilized to increase an efficiency of the electric vehicle.

The deceleration potential of the electric motor primarily depends on a state of charge of a vehicle battery. If the vehicle battery is completely or almost completely charged, the deceleration potential is zero or low, since the vehicle battery cannot store any recuperated electric power. Accordingly, the deceleration potential of the electric motor is great when the vehicle battery is partially or almost fully discharged, since the vehicle battery can store much recuperated electric power. The electric motor can of course not provide a deceleration torque which exceeds its deceleration potential. In other words, the deceleration torque the electric motor can provide is always limited by the deceleration potential.

In the second range of directional stability, the regenerative deceleration torque is provided that is the largest possible in view of the deceleration potential of the electric motor and compatible with a stable distribution of the axle deceleration torques. In other words, recuperated electric power is abandoned in favor of directional stability, i.e. the respective current deceleration potential of the electric motor is not unconditionally utilized to the fullest.

In the third range of directional stability, a regenerative deceleration torque is provided that is reduced compared to the largest possible in view of the deceleration potential of the electric motor and compatible with a stable distribution of the axle deceleration torques. In other words, more recuperated electric power is abandoned in favor of directional stability, i.e. the respective current deceleration potential of the electric motor is utilized to a lesser extent than in the second range.

In the above embodiments, the first range of directional stability, the second range of directional stability, and the third range of directional stability may follow each other or overlap in transitional regions, and a directional stability of the electric vehicle can decrease from the first range of directional stability to the second range of directional stability and further to the third range of directional stability. The three ranges mentioned above thus continuously cover a spectrum of directional stability of the electric vehicle. They may also merge smoothly into each other. A comparison of the three operating modes defined above reveals that the deceleration torque provided by the electric motor decreases from the first range of directional stability to the second range of directional stability and further to the third range of directional stability, i.e. from a high directional stability to a low directional stability.

In other embodiments, a deceleration torque to be provided by the electric motor or a deceleration torque to be provided by the friction brake system and/or an axle deceleration torque to be provided for the first axle or an axle deceleration torque to be provided for the second axle are calculated by a control device, and the control device controls the electric motor and the friction brake system based on the calculated distribution. The control device calculates the variables mentioned based on the total deceleration torque determined by the driver using the operating element and takes the directional stability of the electric vehicle and the deceleration potential of the electric motor into account. Then the control device controls the electric motor and the friction brake system such that the calculated deceleration torques are provided by them.

Expediently, the directional stability of the electric vehicle is determined based on a detected lateral acceleration, a detected longitudinal acceleration, a determined total deceleration, a detected slip of a wheel, a detected yaw rate deviation, and/or a slip difference between the first axle and the second axle of the electric vehicle. A connection between the lateral acceleration of a wheel, a slip of the wheel, and maximum deceleration torque which can be provided to the wheel can be described based on the so-called Kamm's circle. The lateral acceleration of the wheel rises with increasing speed and decreasing curve radius of the electric vehicle, and the slip of the wheel increases as friction between the wheel and the road decreases. Accordingly, the lateral acceleration, the longitudinal acceleration, the yaw rate deviation, and the slip of the wheel as well as the slip difference of a trajectory of an electric vehicle depend on physical properties of the wheel on the one hand and on weather-related influences such as temperature and moisture on the other. It will be appreciated that the above variables which influence directional stability are not an exhaustive list. The directional stability can thus also be influenced by other detectable variables.

Lateral acceleration, longitudinal acceleration, total deceleration, yaw rate deviation, the slip difference between the first axle and the second axle or the slip of the wheel can be detected using respective sensors, which are connected to the control device. Alternatively or in addition, other physical variables which correlate with directional stability, such as a travel speed of the electric vehicle, can of course be detected using suitable sensors and included in the determination of the directional stability of the electric vehicle.

The subject matter of the invention also is a control device for an electric vehicle, which is configured to control an electric motor of an electric vehicle and a friction brake system of an electric vehicle to provide an axle deceleration torque for a first axle of the electric vehicle, which can be decelerated by the electric motor and/or the friction brake system, and/or an axle deceleration torque for a second axle, which can only be decelerated by the friction brake system. The control device controls a regenerative brake system of the electric motor formed by the electric motor and the friction brake system based on a total deceleration torque determined by the driver using an operating element.

The control device is configured to provide a deceleration torque of the electric motor depending on a directional stability of the electric vehicle, particularly in a method according to the invention. Dependence on directional stability counteracts an instability of the electric vehicle caused by the deceleration torque of the electric motor. In addition to directional stability, the deceleration torque to be provided may depend on other physical variables, such as the deceleration potential of the electric motor, which depends on the state of charge of a battery of the electric vehicle.

Another subject matter of the invention is an electric vehicle, which includes an electric motor and a friction brake system, a first axle which cam be decelerated by the electric motor and the friction brake system, and a second axle which can only be decelerated by the friction brake system, and which includes a control device according to the invention. The electric vehicle according to the invention has a high efficiency without impairment of the directional stability of the electric vehicle.

BRIEF DESCRIPTION OF THE DRAWINGS

The invention is schematically represented in the drawing based on embodiments thereof and will be described in detail with reference to the drawing. Wherein.

DETAILED DESCRIPTION

Figure 1:
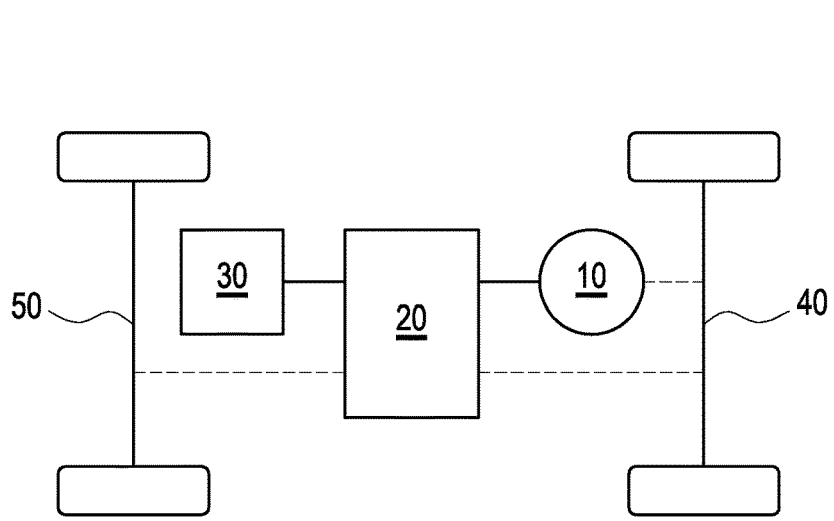
FIG. 1 shows a block diagram of an electric vehicle according to the invention.

FIG. 1 shows a block diagram of an electric vehicle 1 according to the invention. The electric vehicle 1 includes an electric motor 10 and a friction brake system 20, a first axle 40 which can be decelerated by the electric motor 10 and the friction brake system 20 and is configured as a rear axle, and a second axle 50 which can only be decelerated by the friction brake system 20 and is configured as a front axle.

The electric vehicle 1 further includes a control device 30 and an operating element in the form of a brake pedal which is connected to the friction brake system 20 and the control device 30 and not shown in the figures, which pedal a driver can use to determine a total deceleration torque for braking the electric vehicle 1.

The control device 30 is configured to control the electric motor 10 and the friction brake system 20 to provide an axle deceleration torque for the first axle 40 and an axle deceleration torque for the second axle 50, wherein a deceleration torque of the electric motor 10 is provided depending on a directional stability of the electric vehicle 1.

The electric vehicle 1 further includes common sensors for detecting a lateral acceleration, a longitudinal acceleration, a total deceleration, a slip of wheels, a yaw rate deviation, and a slip difference between the first axle 40 and the second axle 50 of the electric vehicle.

For braking the electric vehicle 1, an axle deceleration torque for the first axle 40 is provided by the electric motor 10 and/or by the friction brake system 20. The deceleration torque of the electric motor 10 is provided depending on a directional stability of the electric vehicle 1.

Furthermore, a deceleration torque for the second axle 50 is exclusively provided by the friction brake system 20. Relative portions of the axle deceleration torque for the first axle 40 and an axle deceleration torque for the second axle 50 of a specific total deceleration torque are also provided depending on directional stability.

The directional stability of the electric vehicle 1 is determined based on a lateral acceleration, longitudinal acceleration, total deceleration, yaw rate deviation, slip difference between the first axle 40 and the second axle 50, as detected by a sensor, and/or based on a sensor-detected slip of the wheels.

The deceleration torque of the electric motor 10 to be provided and the deceleration torque of the friction brake system 20 to be provided as well as the axle deceleration torque for the first axle 40 and the axle deceleration torque for the second axle 50 are calculated by the control device 30. The control device 30 controls the electric motor 10 and the friction brake system 20 based on the calculated distribution in order to brake the vehicle.

To improve the directional stability of the electric vehicle 1, the deceleration torque provided by the electric motor 10 is reduced as directional stability declines. The objective is to provide as large a deceleration torque of the electric motor 10 as possible, but compatible with deceleration potential of the electric motor 10 and the directional stability of the electric vehicle 1.

Specifically, a deceleration torque of the electric motor 10 that is as large as possible and compatible with the deceleration potential of the electric motor 10 is provided in a first range of directional stability. A deceleration torque of the electric motor 10 that is as large as possible and compatible with the deceleration potential of the electric motor 10 is provided in a second range of directional stability, wherein relative portions of axle deceleration torques are provided that are stable with respect to driving dynamics. A deceleration torque of the electric motor 10 that is reduced compared to an as large as possible deceleration torque and compatible with the deceleration potential of the electric motor 10 is provided in a third range of directional stability, wherein relative portions of axle deceleration torques are provided that are stable with respect to driving dynamics.

This creates a working space for control systems such as ABS, TCS, ESP, and the like.

The first range of directional stability, the second range of directional stability, and the third range of directional stability overlap in transitional regions to merge smoothly into each other, but they may also follow each other without an overlap. Directional stability of the electric vehicle 1 decreases from the first range of directional stability to the second range of directional stability and further to the third range of directional stability.

Figure 2:
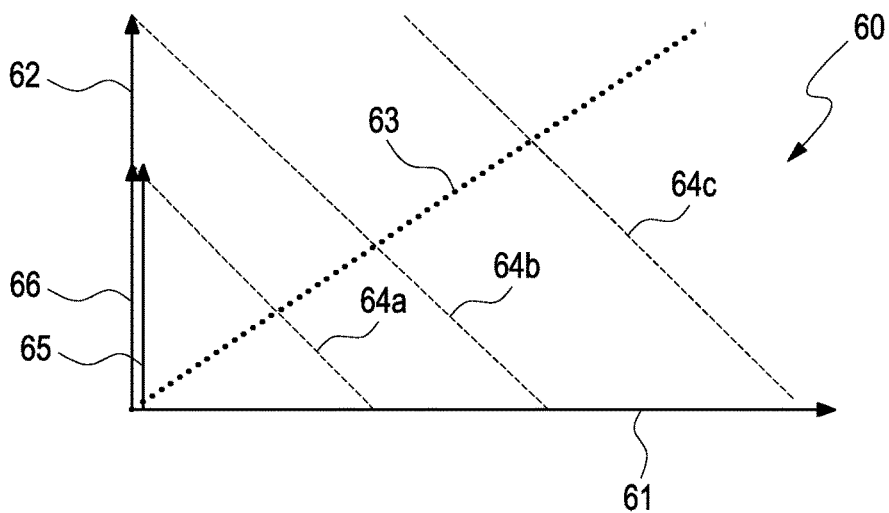
FIG. 2 shows a functional graph of a distribution of deceleration torques in a first range of directional stability.

FIG. 2 shows a functional graph 60 of a distribution of deceleration torques in a first range of directional stability. The functional graph 60 includes an x-axis 61 along which a deceleration torque of the second axle provided by friction brake system 20 is plotted, and a y-axis 62 along which a deceleration torque of the first axle provided by the electric motor 10 and, optionally, the friction brake system 20 is plotted. The functional graph 60 shows a stable axle distribution 63 and three different total deceleration torques 64a, b, c, wherein the total deceleration torque 64a is the smallest and total deceleration torque 64c is the largest. Furthermore, a deceleration potential 65 is entered in the functional graph 60. The deceleration potential 65 is sufficient to provide the total deceleration torque 64a determined by the driver of the electric vehicle 1. The total deceleration torque 64a is only provided as deceleration torque 66 of the electric motor for the first axle while the friction brake system is inactive, such that the second axle is not decelerated. The electric vehicle is decelerated via one axle and exclusively regeneratively.

Figure 3:
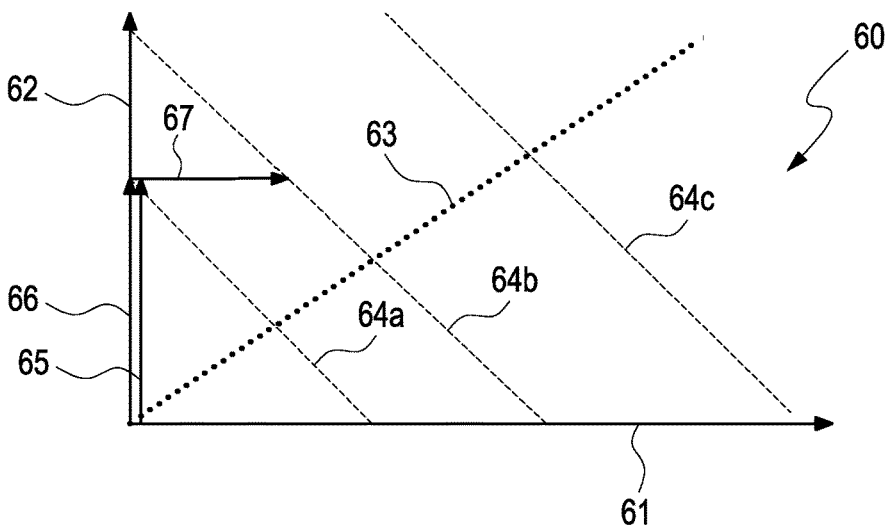
FIG. 3 shows a functional graph of a distribution of deceleration torques in a first range of directional stability.

FIG. 3 shows a functional graph 60 of a distribution of deceleration torques in the first range of directional stability. The functional graph 60 has the same basic structure as the functional graph 60 shown in FIG. 2. The deceleration potential 65 is not sufficient to provide the total deceleration torque 64b determined by the driver. The deceleration torque 64b is provided as the sum total of a deceleration torque 66 of the electric motor and a smaller deceleration torque 67 of the friction brake system. Utilizing the deceleration potential 65, the axle deceleration torque of the first axle is exclusively provided by the electric motor, and the axle deceleration torque of the second axle is provided by the friction brake system in such a manner that an at least approximately stable axle distribution is achieved. The electric vehicle is decelerated via two axles, in different degrees regeneratively or frictionally per axle, wherein the axle deceleration torque of the first axle is larger than the axle deceleration torque of the second axle.

Figure 4:
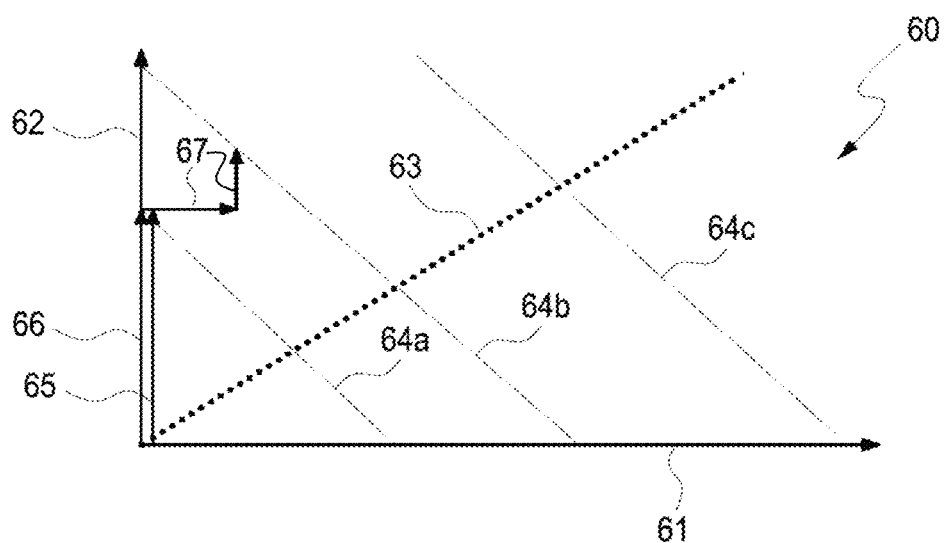
FIG. 4 shows a functional graph of a distribution of deceleration torques in a first range of directional stability.

FIG. 4 shows a functional graph 60 of a distribution of deceleration torques in the first range of directional stability. The functional graph 60 has the same basic structure and relates to the same total deceleration torque 64b as the functional graph 60 shown in FIG. 3. The deceleration potential 65 is not sufficient to provide the total deceleration torque 64b determined by the driver. The deceleration torque 64b is provided as the sum total of a deceleration torque 66 of the electric motor and a smaller deceleration torque 67 of the friction brake system. Utilizing the deceleration potential 65, the axle deceleration torque of the first axle is provided jointly by the electric motor and the friction brake system, and the axle deceleration torque of the second axle is provided by the friction brake system. The electric vehicle is decelerated via two axles, in different degrees regeneratively or frictionally per axle, wherein the axle deceleration of the first axle is larger than the axle deceleration of the second axle. However, the relative portion of axle deceleration of the first axle is larger than in FIG. 3. The axle distribution can be selected for increasing the comfort of an electric vehicle, e.g. for reducing a braking noise (acoustics). For example, a preferred axle distribution can be defined in that no valve of the friction brake system must be operated for decelerating the electric vehicle, which reduces the occurrence of braking noises.

Figure 5:
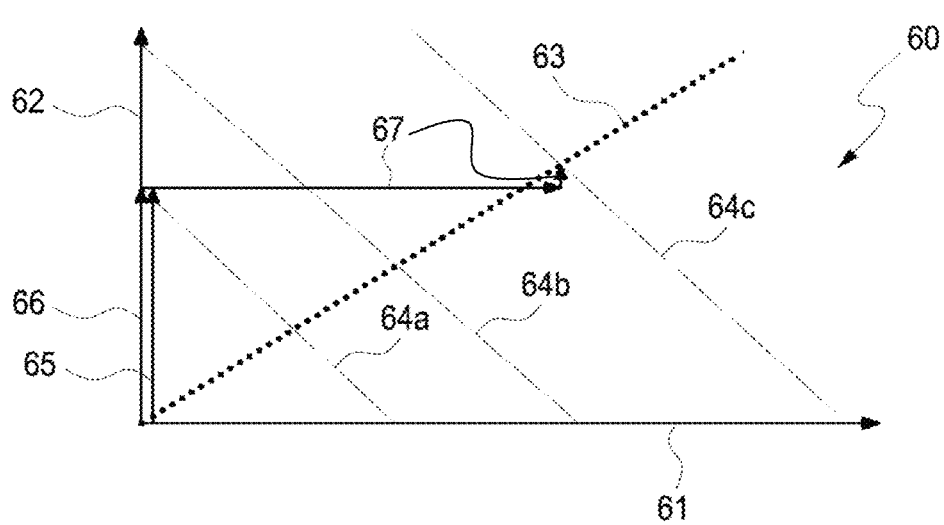
FIG. 5 shows a functional graph of a distribution of deceleration torques in a first range of directional stability.

FIG. 5 shows a functional graph 60 of a distribution of deceleration torques in the first range of directional stability. The functional graph 60 has the same basic structure as the functional graph 60 shown in FIG. 2. The deceleration potential 65 is not sufficient to provide the total deceleration torque 64c determined by the driver. The deceleration torque 64c is provided as the sum total of a deceleration torque 66 of the electric motor and a larger deceleration torque 67 of the friction brake system. Utilizing the deceleration potential 65, the axle deceleration torque of the first axle is provided jointly by the electric motor and the friction brake system, and the axle deceleration torque of the second axle is provided by the friction brake system in such a manner that relative portions of axle deceleration torques are present that are stable with respect to driving dynamics. The electric vehicle is decelerated via two axles, in different degrees regeneratively or frictionally per axle, wherein the axle deceleration torque of the first axle is smaller than the axle deceleration torque of the second axle.

Figure 6:
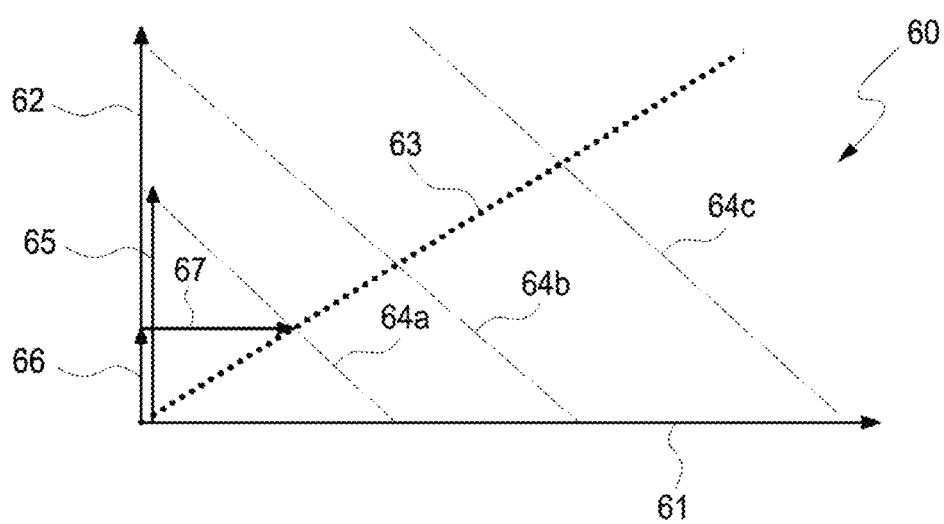
FIG. 6 shows a functional graph of a distribution of deceleration torques in a second range of directional stability.

FIG. 6 shows a functional graph 60 of a distribution of deceleration torques in the second range of directional stability. The functional graph 60 has the same basic structure as the functional graph 60 shown in FIG. 2. The deceleration potential 65 is sufficient to provide the total deceleration torque 64a determined by the driver. Despite that, the deceleration torque 64c is provided as the sum total of a deceleration torque 66 of the electric motor and a larger deceleration torque 67 of the friction brake system. Partially utilizing the deceleration potential 65, the axle deceleration torque of the first axle is provided jointly by the electric motor and the friction brake system, and the axle deceleration torque of the second axle is provided by the friction brake system in such a manner that relative portions of axle deceleration torques are present that are stable with respect to driving dynamics. The electric vehicle is decelerated deviating from FIG. 2, that is, via two axles, in different degrees regeneratively or frictionally per axle, wherein the axle deceleration of the first axle is smaller than the axle deceleration of the second axle.

Figure 7:
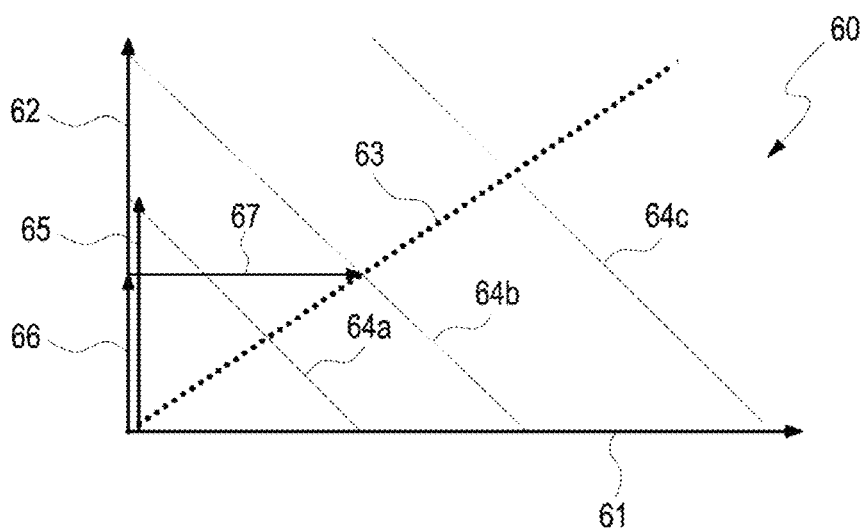
FIG. 7 shows a functional graph of a distribution of deceleration torques in a second range of directional stability.

FIG. 7 shows a functional graph 60 of a distribution of deceleration torques in the second range of directional stability. The functional graph 60 has the same basic structure as the functional graph 60 shown in FIG. 2. The deceleration potential 65 is not sufficient to provide the total deceleration torque 64b determined by the driver. The deceleration torque 64b is provided as the sum total of a deceleration torque 66 of the electric motor and a larger deceleration torque 67 of the friction brake system. Partially utilizing the deceleration potential 65, the axle deceleration torque of the first axle is provided jointly by the electric motor and the friction brake system, and the axle deceleration torque of the second axle is provided by the friction brake system in such a manner that a stable axle distribution is achieved. The electric vehicle is decelerated as in FIGS. 3 and 4 via two axles, in different degrees regeneratively or frictionally per axle, wherein the axle deceleration torque of the first axle is smaller than the axle deceleration torque of the second axle.

Figure 8:
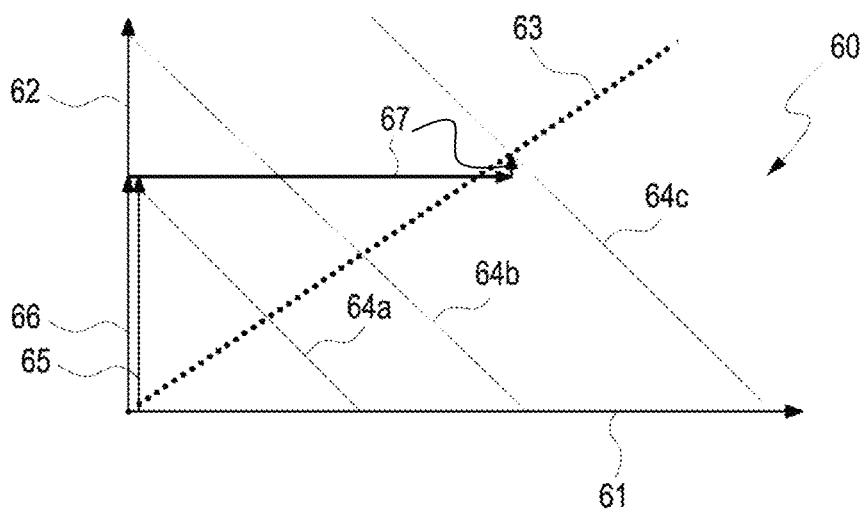
FIG. 8 shows a functional graph of a distribution of deceleration torques in a second range of directional stability.

FIG. 8 shows a functional graph 60 of a distribution of deceleration torques in the second range of directional stability. The functional graph 60 has the same basic structure as the functional graph 60 shown in FIG. 2. The deceleration torques match the deceleration torques shown in FIG. 5. It is evident that it is quite possible to provide identical distributions of deceleration torques in different ranges. The distribution shown here is without an alternative option in the second range of directional stability, while the distribution shown in FIG. 5 is just one among many options of providing the total deceleration torque 64c.

Figure 9:
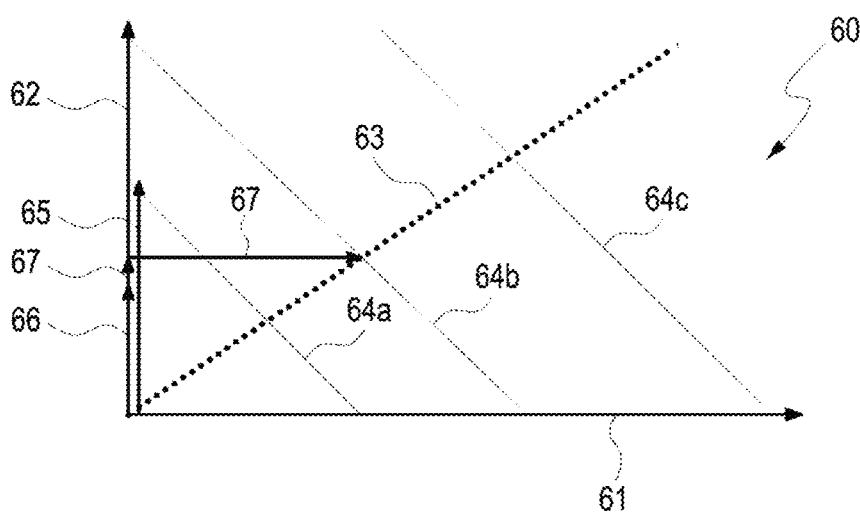
FIG. 9 shows a functional graph of a distribution of deceleration torques in a third range of directional stability.

FIG. 9 finally shows a functional graph 60 of a distribution of deceleration torques in the third range of directional stability. The functional graph 60 has the same basic structure as the functional graph 60 shown in FIG. 2. The distribution of the deceleration torques differs from the distribution shown in FIG. 7 for the second range in that the axle deceleration torque of the first axle is provided jointly by the electric motor and the friction brake system, i.e. the friction brake system decelerates both the first axle and the second axle of the electric vehicle.

The method will be explained in detail with reference to two exemplary cases.

If the driver determines a total deceleration torque of −1000 Nm and the electric motor 10 has a deceleration potential of −1000 Nm, the electric motor 10 alone will provide the total deceleration torque in the first range of directional stability. In the second and third ranges, relative portions of the axle deceleration torque of the first axle 40 and the axle deceleration torque of the second axle 50 should be 30% and 70%, respectively, according to a stable distribution of axle deceleration torques. In the second range, the electric motor 10 provides a deceleration torque of −300 Nm for the first axle and the friction brake system 20 provides a deceleration torque of −700 Nm for the second axle 50, i.e. the first axle 40 is decelerated regeneratively only. In the third range, the electric motor 10 and the friction brake system 20 provide a deceleration torque of −100 Nm and −200 Nm, respectively, for the first axle 40, and the friction brake system 20 provides a deceleration torque of −700 Nm for the second axle 50, i.e. the deceleration torque of the electric motor 10 provided for the first axle 40 is smaller than in the second range.

If a driver determines a total deceleration torque of −1000 Nm and the electric motor 10 has a deceleration potential of −200 Nm, the electric motor 10 provides a deceleration torque of −200 Nm and the friction brake system 20 provides a deceleration torque of −800 Nm in the first range of directional stability, wherein the distribution of axle deceleration torques of the friction brake system 20 in itself as well as overall, including the electric motor 10, is generally freely selectable, but mostly satisfies specific safety or comfort criteria. In the second and third ranges, relative portions of the axle deceleration of the first axle 40 and the axle deceleration of the second axle 50 should be 30% and 70%, respectively, according to a stable axle distribution. In the second range, the electric motor 10 and the friction brake system 20 provide a deceleration torque of −200 Nm and −100 Nm, respectively, for the first axle, and the friction brake system 20 provides a deceleration torque of −700 Nm for the second axle 50. In the third range, the electric motor 10 and the friction brake system 20 provide a deceleration torque of −100 Nm and −200 Nm, respectively, for the first axle 40, and the friction brake system 20 provides a deceleration torque of −700 Nm for the second axle 50, i.e. the deceleration torque of the electric motor 10 provided for the first axle 40 is smaller than in the second range.

A significant advantage of the method according to the invention is that it achieves good directional stability of the electric vehicle on the one hand and high efficiency of the electric vehicle on the other, which is accompanied by high efficiency of the braking method.

The invention claimed is:

1. A method for braking an electric vehicle, comprising:
providing a rear axle deceleration torque for a rear axle of the electric vehicle via at least an electric motor of the electric vehicle;
providing at least a front axle deceleration torque for a front axle of the electric vehicle via a friction brake system of the electric vehicle;
calculating, via a control device, a braking distribution by which a total requested braking torque is distributed between the friction brake system, the electric motor, the front axle, and the rear axle so as to maintain a directional stability of the electric vehicle; and
controlling, by the control device, the electric motor and the friction brake system according to the braking distribution thus calculated,
wherein the front axle deceleration torque is provided exclusively by the friction brake system,
wherein the directional stability of the electric vehicle is divided into three ranges of directional stability,
wherein, in a first range of directional stability, the total requested braking torque is first distributed to the electric motor up to a maximum deceleration potential of the electric motor or up to the total requested braking torque, whichever is lesser, and any remaining braking torque in cases where the deceleration potential of the electric motor is less than the total requested braking torque is distributed to the friction brake system,
wherein, in the first range of directional stability, distribution of the total requested braking torque also satisfies a comfort criterion which increases comfort of the electric vehicle,
wherein, in a second range of directional stability, the total requested braking torque is divided such that 30% of the total requested braking torque is distributed to the rear axle and 70% of the total requested braking torque is distributed to the front axle, and the rear axle deceleration torque is first provided by the electric motor up to the maximum deceleration potential of the electric motor or up to 30% of the total requested braking torque, whichever is lesser, and any remaining braking torque in cases where the deceleration potential of the electric motor is less than 30% of the total requested braking torque is provided by the friction brake system to the rear axle,
wherein, in a third range of directional stability, the total requested braking torque is divided such that 30% of the total requested braking torque is distributed to the rear axle and 70% of the total requested braking torque is distributed to the front axle, and the rear axle deceleration torque provided by the electric motor is less than that of the second range of directional stability,
wherein, in the third range of directional stability, a control system comprising at least one of an anti-lock brake system and an electronic stability program is configured to be operable when the rear axle deceleration torque provided by the electric motor is greater than zero,
wherein the first range of directional stability, the second range of directional stability, and the third range of directional stability overlap in transitional regions, and
wherein the comfort criterion requires that no valves of the friction brake system be operated while both the electric motor and the friction brake system provide the rear axle deceleration torque.

2. The method according to claim 1, wherein the rear axle deceleration torque provided by the electric motor is reduced as directional stability decreases.

3. The method according to claim 1, wherein a directional stability of the electric vehicle decreases from the first range of directional stability to the second range of directional stability and further to the third range of directional stability.

4. The method according to claim 1, wherein the directional stability of the electric vehicle is determined based on at least one of a detected lateral acceleration, a detected longitudinal acceleration, or a determined total deceleration.

5. The method according to claim 1, wherein the directional stability of the electric vehicle is determined based on a detected yaw rate deviation.

6. The method according to claim 1, wherein the directional stability of the electric vehicle is determined based on a slip difference between the first axle and the second axle of the electric vehicle.

7. The method according to claim 1, wherein the maximum deceleration potential of the electric motor is determined according to a state of charge of a battery of the electric vehicle.

8. The method according to claim 1, wherein blending of the friction brake system and the electric motor to provide the total requested braking torque occurs in all of the first, the second, and the third ranges of directional stability.

9. The method according to claim 1, wherein the total requested braking torque is determined by a functional system for autonomous driving of the electric vehicle.

10. A control device for an electric vehicle, which is configured to:
calculate a braking distribution by which a total requested braking torque is distributed between a friction brake system of the electric vehicle, an electric motor of the electric vehicle, a front axle of the electric vehicle, and a rear axle of the electric vehicle so as to maintain a directional stability of the electric vehicle; and
control the electric motor and the friction brake system according to the braking distribution thus calculated,
wherein a rear axle deceleration torque for the rear axle is provided via at least the electric motor,
wherein at least a front axle deceleration torque for the front axle is provided via the friction brake system,
wherein the front axle deceleration torque is provided exclusively by the friction brake system,
wherein the directional stability of the electric vehicle is divided into three ranges of directional stability,
wherein, in a first range of directional stability, the total requested braking torque is first distributed to the electric motor up to a maximum deceleration potential of the electric motor or up to the total requested braking torque, whichever is lesser, and any remaining braking torque in cases where the deceleration potential of the electric motor is less than the total requested braking torque is distributed to the friction brake system,
wherein, in the first range of directional stability, distribution of the total requested braking torque also satisfies a comfort criterion which increases comfort of the electric vehicle,
wherein, in a second range of directional stability, the total requested braking torque is divided such that 30% of the total requested braking torque is distributed to the rear axle and 70% of the total requested braking torque is distributed to the front axle, and the rear axle deceleration torque is first provided by the electric motor up to the maximum deceleration potential of the electric motor or up to 30% of the total requested braking torque, whichever is lesser, and any remaining braking torque in cases where the deceleration potential of the electric motor is less than 30% of the total requested braking torque is provided by the friction brake system to the rear axle, wherein, in a third range of directional stability, the total requested braking torque is divided such that 30% of the total requested braking torque is distributed to the rear axle and 70% of the total requested braking torque is distributed to the front axle, and the rear axle deceleration torque provided by the electric motor is less than that of the second range of directional stability, wherein, in the third range of directional stability, a control system comprising at least one of an anti-lock brake system and an electronic stability program is configured to be operable when the rear axle deceleration torque provided by the electric motor is greater than zero, wherein the first range of directional stability, the second range of directional stability, and the third range of directional stability overlap in transitional regions, and wherein the comfort criterion requires that no valves of the friction brake system be operated while both the electric motor and the friction brake system provide the rear axle deceleration torque.

11. The control device according to claim 10, wherein a directional stability of the electric vehicle decreases from the first range of directional stability to the second range of directional stability and further to the third range of directional stability.

12. The control device according to claim 10, wherein blending of the friction brake system and the electric motor to provide the total requested braking torque occurs in all of the first, the second, and the third ranges of directional stability.

13. The control device according to claim 10, wherein the total requested braking torque is determined by a functional system for autonomous driving of the electric vehicle.

14. An electric vehicle comprising:
an electric motor, a friction brake system, a front axle, a rear axle, and a control device,
wherein the control device calculates a braking distribution by which a total requested braking torque is distributed between the friction brake system, the electric motor, the front axle, and the rear axle so as to maintain a directional stability of the electric vehicle,
wherein the control device controls the electric motor and the friction brake system according to the braking distribution thus calculated,
wherein a rear axle deceleration torque for the rear axle is provided via at least the electric motor,
wherein at least a front axle deceleration torque for the front axle is provided via the friction brake system,
wherein the front axle deceleration torque is provided exclusively by the friction brake system,
wherein the directional stability of the electric vehicle is divided into three ranges of directional stability, wherein, in a first range of directional stability, the total requested braking torque is first distributed to the electric motor up to a maximum deceleration potential of the electric motor or up to the total requested braking torque, whichever is lesser, and any remaining braking torque in cases where the deceleration potential of the electric motor is less than the total requested braking torque is distributed to the friction brake system, wherein, in the first range of directional stability, distribution of the total requested braking torque also satisfies a comfort criterion which increases comfort of the electric vehicle, wherein, in a second range of directional stability, the total requested braking torque is divided such that 30% of the total requested braking torque is distributed to the rear axle and 70% of the total requested braking torque is distributed to the front axle, and the rear axle deceleration torque is first provided by the electric motor up to the maximum deceleration potential of the electric motor or up to 30% of the total requested braking torque, whichever is lesser, and any remaining braking torque in cases where the deceleration potential of the electric motor is less than 30% of the total requested braking torque is provided by the friction brake system to the rear axle, wherein, in a third range of directional stability, the total requested braking torque is divided such that 30% of the total requested braking torque is distributed to the rear axle and 70% of the total requested braking torque is distributed to the front axle, and the rear axle deceleration torque provided by the electric motor is less than that of the second range of directional stability, wherein, in the third range of directional stability, a control system comprising at least one of an anti-lock brake system and an electronic stability program is configured to be operable when the rear axle deceleration torque provided by the electric motor is greater than zero, wherein the first range of directional stability, the second range of directional stability, and the third range of directional stability overlap in transitional regions, and wherein the comfort criterion requires that no valves of the friction brake system be operated while both the electric motor and the friction brake system provide the rear axle deceleration torque.

15. The electric vehicle according to claim 14, wherein a directional stability of the electric vehicle decreases from the first range of directional stability to the second range of directional stability and further to the third range of directional stability.

16. The electric vehicle according to claim 14, wherein blending of the friction brake system and the electric motor to provide the total requested braking torque occurs in all of the first, the second, and the third ranges of directional stability.

17. The electric vehicle according to claim 14, wherein the total requested braking torque is determined by a functional system for autonomous driving of the electric vehicle.

* * * * *